2,735,818
Patented Feb. 21, 1956

2,735,818

SCALE REMOVAL

Paul H. Cardwell and Louis H. Eilers, Tulsa, Okla., assignors to The Dow Chemical Company, Midland, Mich., a corporation of Delaware No Drawing. Application December 10, 1952,
Serial No. 325,208

2 Claims. (Cl. 252—136)

The invention relates to methods of and compositions for the removal of scale or acid-soluble deposits, especially those from ferrous metal surfaces. It more particularly concerns a viscous scale removing composition containing hydrochloric acid.

Heretofore, in the use of aqueous hydrochloric acid solution for the removal of scale or oxide deposits as in descaling the insides of vessels, such as tanks, steam generators, heat exchangers, and the like, the usual practice is to fill the vessel with the acid solution and leave the acid solution in the vessel until the scale is dissolved or sloughed off. Sheets and plates are usually descaled by immersion in a tank filled with the acid solution. Used in this way, the volume of the acid solution generally greatly exceeds the stoichiometrical equivalent of that required to attack and dissolve the acid-soluble scale constituents. As a consequence, relatively large volumes of partially spent acid are produced and become a waste.

It is the principal object of the invention to provide a scale removing composition comprising hydrochloric acid which upon being applied to the surfaces to be descaled adheres to them in a layer thick enough to provide the required amount of acid for descaling so that the use of large volumes of acid solution, as in filling a vessel to be descaled, may be avoided. Other objects and advantages will appear as the description of the invention proceeds.

The invention is predicated upon the discovery that by mixing with the hydrochloric acid solution the combination of (1) a particulated absorbent material capable of becoming soaked with the liquid acid solution, (2) a gelling agent capable of thickening the acid solution so that it tends readily to retain the absorbent material in suspension, and (3) a material capable of reducing loss of HCl from the acid solution a composition is obtained which is viscous, adhesive, and capable of being pumped as a semi-fluid. It may be applied, as by spraying, to a surface to be descaled to provide a layer thereon which remains in situ irrespective of the orientation of the surface and while in situ attacks and dissolves acid-soluble scale constituents with high efficiency of use of the HCl content of the composition. After the composition has done its work, the spent composition is readily removable from the surface by flushing with water. The invention then consists of the scale removing composition and method of descaling a surface therewith herein fully described and particularly pointed out in the claims.

In carrying out the invention, hydrochloric acid solution of any suitable strength may be used, such as an aqueous solution in which the HCl content is from 5 to 30 per cent by weight. A generally suitable concentration is about 20 per cent of HCl. To reduce the tendency for HCl to escape from the acid solution, especially in the higher concentrations, an alkali metal silicate is added, e. g. sodium meta- or ortho-silicate, in amount between about 0.2 and 0.8 per cent. A generally suitable amount is 0.6 per cent. The acid solution containing the silicate is thickened as by mixing it with a thickening or gelling agent, such as pectin, gum karaya, methyl cellulose, Irish moss, psyllium seed, gum ghatti, gum pershir, and gum shiraz. The amount of thickening agent to use is not sharply critical and may be ascertained readily by trial. Suitable proportions range from about 0.3 per cent to as much as 25 per cent of the weight of the acid solution. Effective amounts are those which thicken the acid solution sufficiently to retain in suspension the particulated absorbent material mentioned above which is included in the composition. Some of the thickening agents, e. g. pectin, are more easily wettable by alcohol than by the aqueous acid solution. In such instances, it may be desirable to dissolve or disperse the thickening agent in alcohol before adding it to the acid solution. In addition to the silicate and thickening agent, there is added to the mixture so obtained a quantity of a fragmented absorbent material with which the acid is substantially unreactive. Suitable absorbents are the fibrous materials, e. g. ground leather, ground sponge, ground wood, paper, cotton, bark, nut shells, peat, and corn cobs. Among the various absorbents which may be used, the ground woods appear to be the most desirable, maple wood flour being preferred. The proportion of absorbent material to use is not sharply critical and may be ascertained by trial. In general amounts ranging from about 6 per cent of the weight of the mixture to as much as 30 per cent may be used. Absorbents which imbibe a large proportion of the acid solution, e. g. maple wood flour, may be used in lesser amount than absorbents having a relatively low absorptive capacity, e. g. ground walnut shells.

The following example is illustrative of the descaling composition within the scope of the invention:

Dissolve 55 pounds of sodium meta-silicate in 100 gallons of water and add to the resulting solution 750 gallons of hydrochloric acid containing 28 per cent of HCl by weight. In a separate container mix 44 pounds of pectin with 7 gallons of ethyl alcohol and add the resulting mixture to the foregoing silicate-acid mixture. To the resulting mixture of acid, silicate, and pectin add with stirring 950 pounds of ground maple wood. The maple wood flour soaks up the liquid forming a thin gruel. The resulting mixture which has a volume of about 1000 gallons soon thickens and is then ready for use.

The thickened mixture is adhesive and may be squirted onto vertical surfaces to be descaled, such as the insides of an upstanding cylindrical tank, to form a clinging layer. Spray nozzles having 1/4" openings may be used with pressures of 150 to 200 pounds per square inch. The layer may be built up to a thickness of about 3/16" without danger of its falling off even from a ceiling, such as the inside of the cover of a tank. A layer thickness of about 1/8" to 3/16" suffices to remove ordinary amounts of scale. The applied layer is left on the surface to be descaled for a time sufficient to use up the acid in the mixture or until the scale is dislodged or dissolved and then the surface is rinsed off. In the case of iron oxide scale, the composition may be left on the work for as long as 8 hours before rinsing. If necessary, the treatment of applying the thickened mixture to the surface to be descaled and rinsing off the spent mixture may be repeated one or more times.

The presence in the thickened acid mixture of alkali metal silicate reduces, as aforesaid, the tendency for HCl gas to be lost while the mixture is exposed to the atmosphere, as when a layer of the mixture is deposited upon an exposed surface to be descaled. This effect of the silicate on retarding acid loss is illustrated in the following comparative data: a thickened hydrochloric acid composition consisting of 0.4 per cent of pectin, 10.4 per cent of maple wood flour, the balance being 25 per cent hydrochloric acid containing 0.4 per cent of an inhibitor of the corrosion of iron, lost on the average 3.9 grams of HCl per hour at 85–90° F. from a layer ⅛″ thick and weighing 143 grams. The same composition, but containing 0.54 per cent of sodium meta-silicate, lost on the average 3.05 grams of HCl per hour at 85–90° F. from a layer ⅛″ thick and weighing 151 grams. The silicate also increases the viscosity of the mixture. For example, the foregoing pectin-wood flour-hydrochloric acid mixture without the silicate has a viscosity of 1400 to 1500 centipoises. This viscosity increases to about 1700 to 1800 centipoises with the addition of 0.7 per cent of sodium meta-silicate. The viscosity of the mixture is also affected by the presence of thickening agent. For example, 25 per cent of hydrochloric acid solution containing 0.55 per cent of sodium meta-silicate and 10 per cent of ground maple wood flour but no thickener has a viscosity of about 450 centipoises at 80° F. On adding 0.3 per cent of pectin to this acid mixture, its viscosity increases to 1900 centipoises. A further addition of 0.8 per cent of pectin increases the viscosity to 3800 centipoises after 24 hours' standing. Gum karaya used in place of the pectin in the amount of 0.8 per cent produces a viscosity of 700 centipoises, 0.5 per cent of methyl cellulose used similarly produces a viscosity of 1300 centipoises, 6 per cent of psyllium seed used similarly produces a viscosity of 6700 centipoises. When the HCl concentration is 5 per cent instead of 10 per cent, 0.3 per cent of pectin in the acid mixture produces a viscosity of 300 centipoises, and 0.5 per cent of methyl cellulose produces a viscosity of 590 centipoises.

The effectiveness of the fragmented absorbent materials to absorb the acid solution so that excessive liquidity is avoided is determined by formulating mixtures as described using a sufficient proportion of the absorbent material. For example, 25 per cent of hydrochloric acid solution containing 0.55 per cent of sodium meta-silicate and 0.5 per cent of pectin is 90 per cent absorbed on mixing with it 6 per cent by weight of maple wood flour and 100 per cent absorbed with 11 per cent. The resulting mixture is pumpable and may be sprayed upon surfaces to be descaled. About 15 per cent of ground red wood bark acts about the same as 6 per cent of maple wood flour, and 30 per cent of ground red wood bark about the same as 11 per cent of maple wood flour. Complete absorption is obtained with 6 per cent by weight of ground pecan shells, 10 per cent of ground walnut shells, 14 per cent of ground corn cobs, 18 per cent of ground cocoa shells, 22 per cent of peat moss, 11 per cent of pine wood flour.

Among the advantages of the invention are: only a small volume of the acid mixture is required for a descaling operation; a relatively high concentration of acid can be maintained in contact with the surface to be descaled without excessive wastage of acid; surfaces may be readily freed from scale without the need for the use of a tank or vessel for maintaining the acid in contact with the work.

We claim:

1. A composition for descaling a surface comprising by weight in admixture from 0.2 to 0.8 per cent of an alkali metal silicate, from 0.3 to 25 per cent of a gelling agent selected from the group consisting of pectin, gum karaya, methyl cellulose, Irish moss, psyllium seed, gum ghatti, gum pershir, gum shiraz, from 6 to 30 per cent of a fragmented fibrous material selected from the group consisting of ground leather, sponge, wood, paper, cotton, bark, nut shells, peat, corn cob, the balance being aqueous hydrochloric acid containing from 5 to 30 per cent of HCl.

2. A composition for descaling a ferrous metal surface comprising in admixture an aqueous solution containing from 5 to 30 per cent of HCl, a sufficient quantity of ground wood to absorb the acid solution to form a mixture having the consistency of a gruel, from 0.3 to 0.8 per cent of pectin, and from 0.2 to 0.8 per cent of an alkali metal silicate.

References Cited in the file of this patent

UNITED STATES PATENTS

| 1,345,819 | Wolfe | July 6, 1920 |
| 1,484,444 | Wilson et al. | Feb. 19, 1924 |
| 2,257,467 | Jacobson | Sept. 30, 1941 |

FOREIGN PATENTS

| 21,408 | Great Britain | 1902 |